July 2, 1940. J. M. CHRISTMAN 2,206,451
GEAR FINISHING MACHINE
Filed April 30, 1936 2 Sheets-Sheet 1
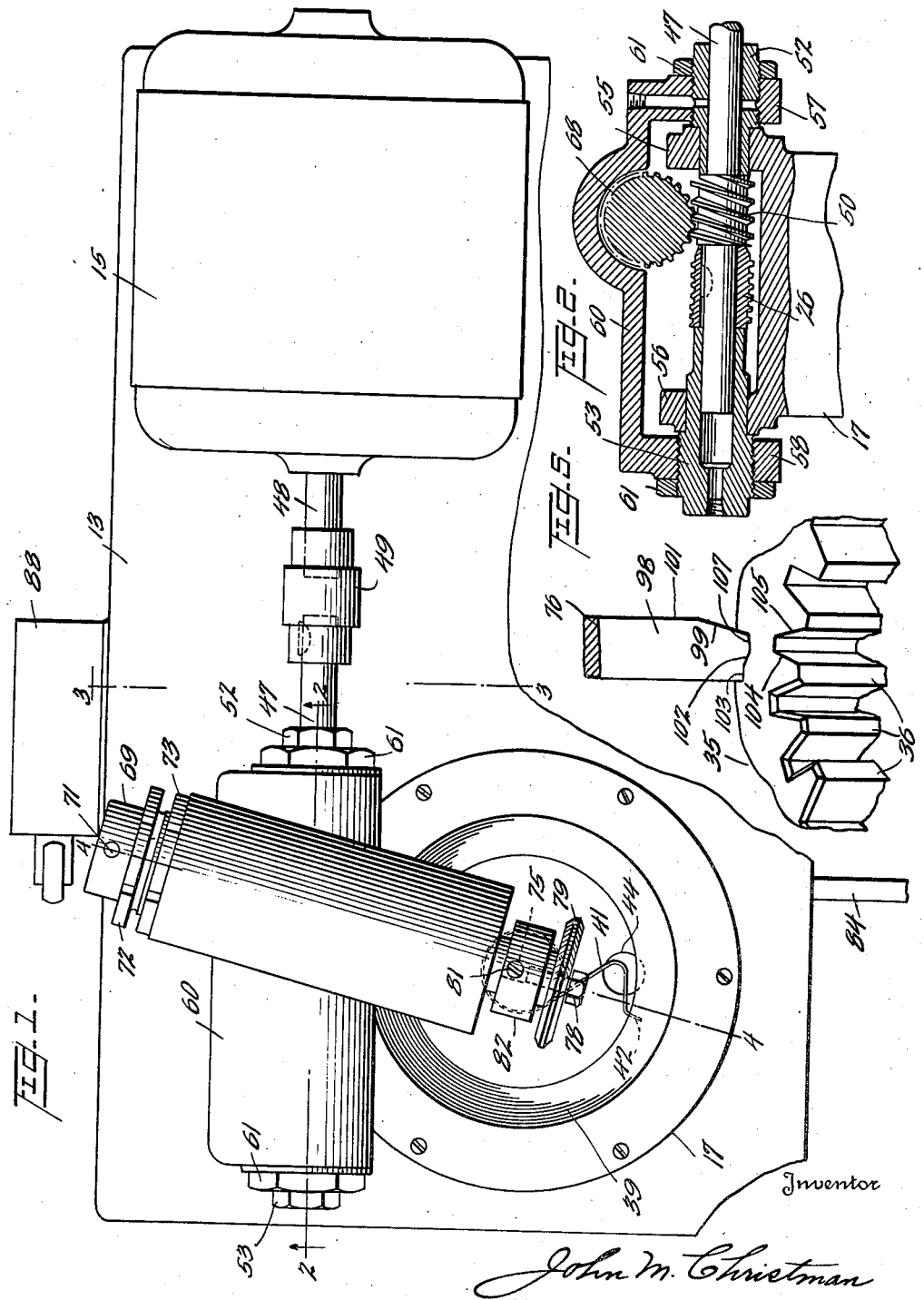
Inventor
John M. Christman
By Watson, Coit, Morse & Grindle
Attorney July 2, 1940.
J. M. CHRISTMAN
2,206,451
GEAR FINISHING MACHINE
Filed April 30, 1936
2 Sheets-Sheet 2
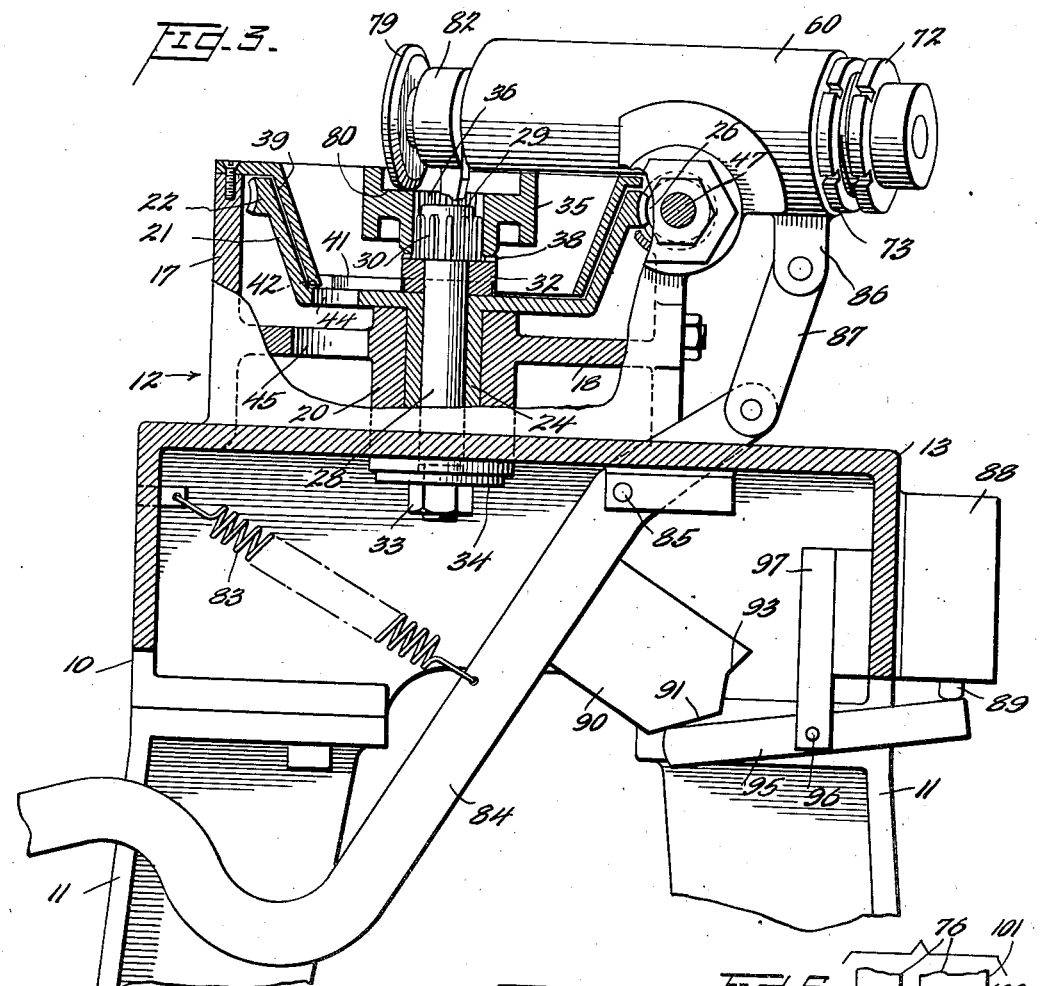
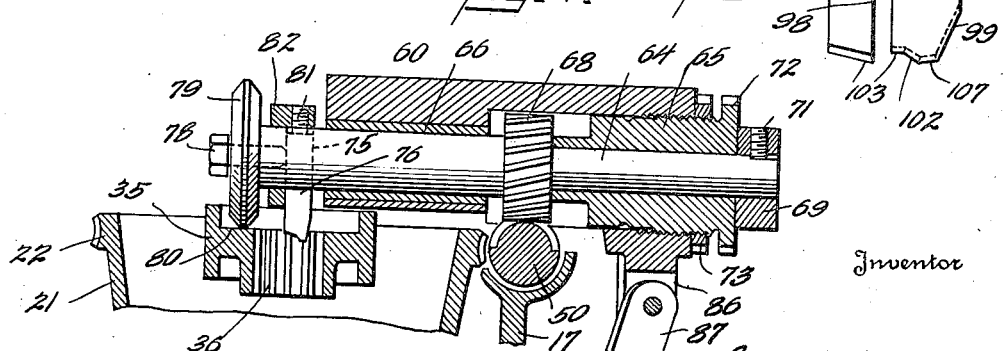
Inventor
John M. Christman
By Watson, Coit, Morse
& Grindle
Attorney Patented July 2, 1940

2,206,451

UNITED STATES PATENT OFFICE 2,206,451

GEAR FINISHING MACHINE

John M. Christman, Detroit, Mich., assignor to Packard Motor Car Company, Detroit, Mich., a corporation of Michigan Application April 30, 1936, Serial No. 77,286

15 Claims. (Cl. 90—1)

This invention relates to apparatus for chamfering, burring, or pointing the ends of teeth on toothed machine elements and has for its object the provision of a machine of this character which is simple to construct and operate and which will rapidly and efficiently chamfer or point the edges of teeth to the extent desired and remove the burrs developed during manufacture of the machine elements at the edges formed by the intersection of the working surfaces of the teeth with the end faces thereof.

This operation not only serves to prevent the breaking off during use of small particles of metal from the toothed elements, which is obviously highly objectionable in the event the elements are used in an automobile transmission or other closed lubricated housing, but in the case of elements which are axially shiftable into and out of mesh, such as toothed clutch elements or gears employed in slidable change speed transmissions, the meshing of such elements is facilitated by the provision of cooperating chamfered or pointed tooth ends.

The machine described herein is particularly effective in the shaping of the teeth on clutch elements such as are commonly employed in connection with the selection of gear ratios in variable ratio transmissions for automobiles. For example, in toothed elements of this character it is especially important that the teeth be guided in proper meshing relation with the teeth of cooperating elements by the formation on the tooth ends of a very deep chamfer as distinguished from the relatively light chamfering operation effected merely for the purpose of removing burrs and rounding or flattening sharp corners at the end edges of gear teeth.

The machine described herein may be adjusted so as either to perform a light chamfering or burring operation or a heavy chamfering or pointing operation, and is most useful for the burring or chamfering of the ends of the teeth on internally toothed elements. In the preferred embodiment of the invention a cutting tool is supported for displacement across the toothed element operated on, being movable into simultaneous cutting engagement with the adjacent end edges of two adjacent teeth, the toothed element being rotated so as to present successive teeth to the tool.

Thus it is a more specific object of the invention to provide a burring, chamfering, or pointing machine employing a cutter having at least one cutting edge and preferably two, the cutter being supported for rotation on an axis transverse to or intersecting the axis of the toothed element. The cutter and the toothed element are rotated on their axes in timed relation and the arrangement is preferably such that during rotation of the cutter the latter moves into the space between adjacent teeth at one side of the element and out of the space between adjacent teeth on the other side of the element on each complete rotation of the cutter, whereby four of the end edges of the teeth on the element are chamfered or beveled. On the next successive complete rotation of the cutter, the toothed element occupies an advanced position so that the cutter passes through the succeeding spaces between adjacent teeth of the element, and the operation is continued until all of the teeth have been burred or pointed.

It is a feature of the invention that the moving parts of the machine need partake only of rotation on fixed axes, no bodily displacement or reciprocatory movement of the parts being necessary. Thus it is possible to operate the machine at very high speeds and at the same time to reduce to a minimum the vibration developed in the machine and the wear on moving parts.

It is a further feature of the machine herein described that the entire operation may be performed automatically, the depth of engagement of the cutter with the toothed element being accurately predetermined and the movement of the cutter into operative relation with the toothed element serving to initiate the drive of the element and the cutter.

Further features and objects of the invention will be apparent from the following description taken in connection with the accompanying drawings, in which Figure 1 is a plan view of a machine embodying the principles of the invention;

Figure 2 is a fragmentary sectional view taken substantially on the line 2—2 of Figure 1;

Figure 3 is a transverse vertical sectional view taken substantially on the line 3—3 of Figure 1;

Figure 4 is a fragmentary sectional view on the line 4—4 of Figure 1;

Figure 5 is a perspective view of a portion of the toothed element and the cutting tool; and Figure 6 is a side and front elevation of the lower end of the cutting tool.

For convenience in illustrating the invention, reference is made to the embodiment thereof shown in the accompanying drawings and specific language is employed to describe the same. It will nevertheless be understood that no limitation of the scope of the invention is thereby intended but that various further modifications and alterations of the illustrated structure are contemplated such as would occur to one skilled in the art to which the invention relates.

Referring first to Figures 1 and 3, it will be observed that the machine is illustrated as supported on a table 10 having legs 11, the moving parts of the machine being mounted on a casting 12 which may be integrally formed. As shown more particularly in Figure 3, the casting 12 may comprise a base 13 of generally box-like construction, the base being bolted directly to the table 10. Adjacent one end of the base and supported on the upper wall thereof is a motor 15 and adjacent its other end the base is formed to provide an upstanding annular bracket 17, the bracket 17 having a transversely extending web 18 which is formed to provide a central boss 20. A generally cup-shaped member 21 having an annular flange 22 at the upper end thereof is supported in the boss 20, the member 21 being formed to provide a depending sleeve portion 24 which is rotatably received within the boss 20 and is of slightly greater length than the latter. The flange portion 22 of the member 21 is preferably provided with worm gear teeth, the latter meshing with and being driven by a worm 26, shown more particularly in Figure 2 of the drawings and hereinafter more fully described.

A spindle 28 extends through the sleeve 24 and is provided at its upper end with an enlarged head 29 having teeth 30 formed thereon. A collar 32 is positioned on the spindle 28 immediately below the head 29 thereof, the collar 32 resting on the base portion of the cup-shaped member 21. At its lower end the spindle 28 is threaded to receive a nut 33, the latter engaging a washer 34 which in turn abuts against the lower end of the sleeve 24. Thus when the nut 33 is tightened, the collar 32 is frictionally clamped against the member 21 to secure the latter to the spindle 28, whereby the latter may be rotated from the worm 26.

In Figure 3 of the drawings an internally toothed element 35, the teeth of which are to be pointed, is shown in operative position in the machine. This toothed element is slidably received on the head 29 of the spindle 28 with the teeth 36 of the element engaged between the teeth 30 of the spindle. It will be observed that the head 29 of the spindle extends only part way through the toothed element 35 so that the ends of the teeth 36 are properly exposed for the performance thereon of the chamfering or pointing operation. The configuration of the element 35 obviously forms no part of the present invention; the element selected for the purpose of illustrating the invention forms part of a synchronizing device for use with a selective change speed transmission of an automobile, but it will be apparent that the machine disclosed herein may be employed for pointing the teeth of any internally toothed clutch or gear element, the dimensions of the head 29, the size and number of the teeth 30, and other details of the machine being readily modified to properly support and chamfer various types of toothed elements. The toothed element 35 is shown as resting on a series of circumferentially spaced, upwardly directed projections 38 formed on the collar 32, these projections facilitating removal of chips and shavings so that successive toothed elements may be readily and properly seated on the head 29.

Secured to the upper edge of the bracket 17 is an annular member 39 which depends into the cup-shaped member 21 and serves to shield the worm gearing from the zone in which the cutting operation takes place, chips or shavings falling downwardly within the member 39 onto the base portion of the member 21. An element 41, which may be formed of spring steel, is received in a slot 42 in the member 39, rests on the base portion of the member 21, and embraces the collar 32, seating in an annular recess in the latter. The element 41 is preferably shaped as shown in Figure 1 to deflect metal chips and shavings toward a point near the periphery of the base of the member 21 from whence they are discharged on each rotation of the member 21 through an aperture 44 formed in the latter and thence downwardly through an aperture 45 formed in the web 18.

The worm 26 is keyed for rotation on a shaft 47 which is driven from the shaft 48 of the motor 15 through a conventional flexible coupling 49. Formed on the shaft 47 or secured thereto is a worm 50. The shaft 47 is supported for rotation in bushings or sleeves 52 and 53, these bushings being in turn respectively received in arms 55 and 56 formed integrally with the collar 17. The bushings 52 and 53 are threaded within downwardly extending lugs 57 and 58 respectively, the latter being formed integrally with a housing 60, lock nuts 61 being threaded on the bushings and clamped against the respective lugs to provide a rigid structure. It will be observed that the housing 60 and the bushings 52 and 53 may be rotated within the arms 55 and 56 and about the axis of the shaft 47.

Referring now to Figure 4, it will be observed that the housing 60 serves to support a shaft 64, the latter being journalled at one end in a sleeve 65 which is threaded within the housing and at the other end in a bearing bushing 66. The sleeve 65 engages at one end with a worm gear 68 which is formed integrally with or secured to the shaft 64, and at the other end with a collar 69 which is secured to the shaft 64 by means of a set screw 71. The sleeve 65 is provided with a slotted peripheral portion 72 for the reception of a tool whereby it can be rotated to displace the shaft 64 to the left or to the right as viewed in Figure 4, the sleeve being locked in position by means of a nut 73 which is threaded thereon and which engages the adjacent end of the housing 60.

The shaft 64 extends beyond the housing 60 and is provided with a slot 75, preferably of rectangular or other non-circular shape in transverse section, a cutting tool 76 passing through the slot and being retained therein by means of a bolt 78, the latter being threaded in the end of the shaft 64. A guide roller 79 is rotatably mounted on the bolt 78, this roller being arranged to engage the flat upper surface 80 of the toothed element 35 adjacent the toothed portion thereof to limit the depth of the cut effected by the tool. A set screw 81 threaded in a collar 82 which is in turn received on the shaft 64 resists end-wise thrust on the tool 76.

An operating lever 84 pivoted to the base 13 as indicated at 85 extends forwardly of the machine within convenient reach of an operator. The lever 84 is connected to a lug 86 depending from the housing 60 by means of a link 87, the weight of the lever and associated parts being preferably partially or completely counterbalanced by means of a spring 83 connected between the lever and the base 13 of the machine. Secured to the base 13 is a conventional switch enclosed in a housing 88, this switch being included in the circuit for the motor 15 and having an operating member 89 which may be displaced upwardly to close the motor circuit. A cam 90 is carried by the lever 84, this cam being provided with a substantially flat surface 91 which may be tangent to an arc having its center at 85, and a reentrant, generally V-shaped surface 93, the surface 93 being substantially closer to the pivot point 85 of the lever 84 than is the flat surface 91. These surfaces are arranged to engage with a lever 95 which is pivoted at 96 to a bracket 97 carried by the base 13 of the machine, the lever 95 being arranged to engage the operating member 89. Thus when the lever 84 occupies the position in which it is shown in Figure 3 of the drawings, the lever 95 has been rocked in a counterclockwise direction by the cam 90 to displace the operating member 89 of the control switch upwardly, thereby closing the motor circuit. When the forward end of lever 84 is displaced upwardly, the V-shaped surface 93 on the cam 90 permits the lever 95 to swing in a clockwise direction to open the motor circuit. It will further be observed that when the lever 84 occupies its lower position, in which the motor is energized, the housing 69 is rocked about the axis of shaft 47 to engage the guide roller 79 with the surface 80 of the toothed member 35, the cutting tool 76 being thereby located in proper operative relation with respect to the toothed element 35 regardless of the axial dimension of the element. When the lever 84 is raised so as to open the motor circuit, the housing 69 is rocked in a clockwise direction as viewed in Figure 3 to remove the cutting tool from operative relation with the toothed element 35, whereby withdrawal of the latter from its seat on the head 29 of the spindle 28 is permitted. The operation is thus entirely automatic, the motor 15 being energized only when the cutting tool is displaced toward the position in which the cutting operation is performed.

As is customary in conventional circuit control switches, the operating member 89 of the switch is yieldingly urged downwardly. Thus as the forward end of the lever 95 rides down the inclined surface of the re-entrant portion 93 of the cam 90, the lever 84 will be urged upwardly by the switch spring so that the roller 79 is yieldingly retained in engagement with the surface 80 of the toothed member 35 to position the tool 76 in operative relation with the work.

The mode of operation of the device as thus described will be apparent. When the several parts of the machine occupy the position in which they are shown in Figure 3, the spindle 28 and toothed element 35 are rotated at a reduced speed from the shaft 47 by means of the worm 26 and worm gear 22. At the same time, the shaft 64 which carries the cutting tool 76 is rotated from the shaft 47 by means of the worm gearing 50, 68 and the cutting tool will sweep across the toothed member 35 to burr, chamfer, or point the ends of the teeth 36 as hereinbefore described.

It will be observed that the driving mechanism is characterized by extreme simplicity, all driving being effected directly from the single rotating shaft 47. Again, each of the moving elements of the drive is rotatable about one of a total of three axes of rotation. Thus the first axis is that of the driving shaft 47, the second axis is that of the shaft 64, about which the cutting tool revolves, and the third axis is that of the spindle 28, about which the work is rotated. The workpiece and the cutting tool are each driven directly through worm gearing from the same driving shaft 47.

As viewed in plan in Figure 1 of the drawings, the axis of the shaft 64 which carries the cutting tool intersects the axis of the spindle 28 when the cutting tool is in operative relation with the toothed member 35, and as the cutting tool is rotated it will first approach and engage the end edges of adjacent teeth at one side of the element to simultaneously cut and chamfer the same, and will thereafter pass across or near the axis of the element and engage and concurrently cut and chamfer the end edges of adjacent teeth disposed near the opposite side of the element, so that on each complete rotation or stroke of the cutting tool the latter will move into operative cutting engagement with four teeth. The movement of the tool may be more clearly understood from an inspection of Figure 5 of the drawings which shows the tool as it is about to enter the space between adjacent teeth on the toothed element 35. The tool is illustrated as provided with a forward, substantially flat face 98, the intersection 99 of this flat face with the side face 101 of the tool forming one of the cutting edges and the intersection of the face 98 with several portions of the lower face of the tool of different relative inclination forming cutting edges 103, 102, and 107. The cutting edges 99 and 102 are effective to chamfer the end edges 104 and 105 respectively of the sides of adjacent teeth 36, the cutting edge 107 is arranged to engage and chamfer the base of the groove between adjacent teeth, and the cutting edge 103 engages and chamfers the outer end edge or crown of one of the adjacent teeth only. Thus with a single tool all of the edges formed at the face of the gear are effectively burred without any duplication whatever of cutting strokes. As viewed in Figure 5, the tool 76 is moving toward the toothed element 35, the tool supporting shaft 64 rotating in counterclockwise direction as viewed from the left-hand end of Figure 4, and the toothed element 35 rotating at a much slower angular speed in a counterclockwise direction as viewed in Figures 1 and 5. The timing is of course such that the tool will properly engage the teeth of the element on approach and recession from the element, the angular displacement of the element during the time required for passage of the tool from engagement with the teeth at one side of the element and into engagement with the teeth at the other side of the element being just sufficient for the purpose. When one complete rotation of the tool has been completed, the extent of rotation of the toothed element during that period is such as to present a succeeding pair of adjacent teeth to the action of the tool.

It will be appreciated that in order to secure proper timing of these operations it may be necessary to adjust the relative speeds of rotation of the tool and element, the relative disposition of the axes of rotation of the tool and element, and the relationship between the rotational axis of the element and the path traced out by the cutting edges of the tool. In other words, the axis of rotation of the tool will not necessarily intersect the axis of rotation of the element, although these axes will ordinarily be transversely related. Again, the circular paths traced out by either of the cutting edges 99 and 102, will not necessarily pass through the axis of rotation of the element 35, but may be displaced toward one side or the other of such axis. However, the necessary correlation of the several factors involved may be readily determined by calculation or experimentation so as to enable the pointing operation to be carried out satisfactorily.

It will be appreciated that the machine disclosed herein can be operated at very high speeds and that the pointing of all the teeth on a single element may be rapidly completed, the machine being capable of cutting four tooth edges to the entire depth required on each complete rotation of the tool. In some instances it may be desirable to so dispose the cutting tool with respect to the element that only one tooth will be cut or chamfered on each complete rotation of the tool or so that only one pair of adjacent teeth will be cut on each rotation of the tool. This is necessarily so in the event the toothed element is of the external rather than the internal type, and it will be understood that many features of the invention are applicable to the treatment of either type of element.

For example, if it is desired to effect a chamfering operation at one side only of the gear on each rotation of the tool, the housing 60 may be adjusted in the axial direction of the shaft 47 by loosening the lock nuts 61 and rotating the bushing 53, which has threaded engagement with the housing 60, the latter being subsequently secured in the adjusted position. It will be appreciated that by such adjustment, the housing 60 may be moved either to the left or the right from the position in which it is shown in Figure 1, so that the path of movement of the tool is displaced to either side of the axis of the gear being chamfered to such an extent that the tool will engage the teeth at one side only of the gear.

It will furthermore be appreciated that in the chamfering of different gears having different numbers and thickness of teeth, some difficulty may be encountered in ensuring that the cutting tool will move properly into the tooth spaces at opposite sides of the gear being chamfered. In order to coordinate the path of movement of the tool and the tooth spaces under such circumstances, it is sometimes necessary to adjust the shaft 64 axially to displace the tool slightly to one or the other side of the center of the toothed element, this adjustment being effected by loosening the lock nut 73 and rotating the bushing 72 in which the shaft 64 is journalled. Such displacement of the tool may result in a slight difference in the character of the cut effected by the two cutting edges of the tool, but this difference is not objectionable and is within practical limits.

For convenience in describing and claiming the invention, the operation performed by the machine illustrated herein is described as "pointing," the term being employed in a sense sufficiently broad to include within its scope any of the operations commonly involved in the removal of the metal from the tooth ends, for example chamfering or burring.

Having thus described the invention, what is claimed as new and desired to be secured by Letters Patent is:

1. In a machine for pointing tooth ends of internally toothed elements, the combination with means supporting a toothed element to be pointed for rotation on the axis thereof, of a cutting tool, and means supporting said cutting tool for rotation about an axis substantially intersecting to the axis of said element through a space intermediate two adjacent teeth on the element and into concurrent cutting engagement with the end edges of both teeth to effect simultaneous chamfering thereof, the axis of the toothed element being disposed approximately in the plane of rotation of a point on the cutting edge of the tool.

2. In a machine for chamfering the end edges of toothed elements, the combination with means supporting a toothed element for rotation on the axis therof, of a cutting tool, and means supporting said cutting tool for rotation about an axis substantially intersecting the axis of rotation of said toothed element for movement into and out of chamfering engagement with the end edges of the teeth of said element, the axis of the toothed element being disposed approximately in the plane of rotation of a point on the cutting edge of the tool.

3. In a machine for pointing tooth ends of toothed machine elements, the combination with a support for a toothed element, a tooth pointing tool, a support for said tool, means for rotating said tool through a path lying intermediate two adjacent teeth of said element and in a direction generally radial to the axis of said element, means for effecting relative displacement of said supports in a plane generally parallel to the axis of said toothed element to place said tool and element in operative or inoperative relation, and means limiting relative displacement of said supports in one direction to define the operative relation of said tool and element.

4. In a machine for pointing tooth ends of toothed machine elements, the combination with a support for a toothed element, a tooth pointing tool, a support for said tool, means for effecting relative displacement of said supports to place said tool and element in operative or inoperative relation, and means limiting relative displacement of said supports in one direction to define the operative relation of said tool and element, said last named means including a member carried by the support for said tool and engaging said element when said tool is in operative relation therewith.

5. In a machine for pointing tooth ends of toothed machine elements, the combination with a support adapted to receive an element for rotation about the axis thereof, a tooth pointing tool, a support on which said tool is mounted for rotation about a second axis, said axes being transversely disposed when said tool and element are in operative relation, the axis of the toothed element being disposed approximately in the plane of rotation of a point on the cutting edge of the tool, means for rotating said tool through a space intermediate two adjacent teeth of said elements, means for effecting relative displacement of said supports in a plane generally parallel to the axis of said toothed element to place said tool and element in operative or inoperative relation, and means limiting relative displacement of said supports in one direction to define the operative relation of said tool and element.

6. In a machine for pointing tooth ends of toothed machine elements, the combination with a support adapted to receive an element for rotation about the axis thereof, a tooth pointing tool, a support on which said tool is mounted for rotation about a second axis, said axes being transversely disposed when said tool and element are in operative relation, means for effecting relative displacement of said supports to place said tool and element in operative or inoperative relation, and means limiting relative displacement of said supports in one direction to define the operative relation of said tool and element, said last named means including a roller carried by the support for said tool and engaging said element when said tool is in operative relation therewith.

7. In a machine for pointing tooth ends of toothed machine elements, the combination with a support adapted to receive an element for rotation about the axis thereof, a tooth pointing tool, a support on which said tool is mounted for rotation about a second axis, said axes being transversely disposed and substantially intersecting when said tool and element are in operative relation, means mounting said supports for relative displacement to place said tool and element in and out of operative relation, a source of motive power, and means operable by relative movement of said supports for automatically establishing driving relation between said source and said tool to rotate the latter from the former when said tool and element are placed in operative relation and for interrupting driving relation between said source and said tool when said tool and element are removed from operative relation.

8. In a machine for pointing tooth ends of internally toothed machine elements, the combination with a support adapted to receive an element for rotation about the axis thereof, a tooth pointing tool, a support on which said tool is mounted for rotation about a second axis, said axes being substantially intersecting when said tool and element are in operative relation, the axis of the toothed element being disposed approximately in the plane of rotation of a point in the cutting edge of the tool, a rotatable shaft on which said tool support is mounted for swinging movement to place said tool and element in operative or inoperative relation, and driving connections between said shaft and tool and between said shaft and said element, whereby said tool and element may be rotated in timed relation from said shaft about the respective axes thereof.

9. In a machine for pointing tooth ends of toothed machine elements, the combination with a support adapted to receive an element for rotation about the axis thereof, a tooth pointing tool, a support on which said tool is mounted for rotation about a second axis, said axes being transversely disposed when said tool and element are in operative relation, a rotatable shaft on which said tool support is mounted for swinging movement to place said tool and element in operative or inoperative relation, and driving connections between said shaft and tool and between said shaft and said element, whereby said tool and element may be rotated in timed relation from said shaft about the respective axes thereof, said driving connections comprising worm gearing acting between said shaft and said element support and tool.

10. A method of pointing teeth on internally toothed machine elements which comprises rotating a cutting tool about an axis transverse to the axis of said element and into concurrent cutting engagement with the end edges of an adjacent pair of teeth, and continuing the rotation of said tool to cause the latter during the same rotation to concurrently engage the end edges of an adjacent pair of teeth disposed near the opposite side of said element from said first named pair of teeth.

11. A method of pointing teeth on internally toothed machine elements which comprises rotating a cutting tool about an axis transverse to the axis of said element and into concurrent cutting engagement with the end edges of an adjacent pair of teeth, continuing the rotation of said tool to cause the latter to concurrently engage the end edges of an adjacent pair of teeth disposed near the opposite side of said element from said first named pair of teeth, and rotating said element in timed relation to the rotation of said tool to present further teeth to said tool on successive complete rotational movements of the latter.

12. In a machine for chamfering the end edges of toothed elements, the combination with means supporting a toothed element for rotation on the axis thereof, of a cutting tool, and means supporting said cutting tool for rotation in a plane generally radial to the axis of rotation of said toothed element for movement into and out of chamfering engagement with the end edges of the teeth of said element, said cutting tool having a plurality of cutting edges for concurrent engagement with the end edges of a pair of adjacent teeth, the angle between one of said cutting edges and the plane of the toothed element being greater than the corresponding angle of the other cutting edge to compensate for rotational movement of the gear during the cutting operation.

13. In a machine for pointing tooth ends of internally toothed elements, the combination with means supporting a toothed element to be pointed for rotation on the axis thereof, of a cutting tool, means supporting said tool for rotation about an axis transverse to the axis of said element, said tool axis being fixed with respect to the element being pointed, during the pointing operation, and being disposed in a plane generally perpendicular to the axis of said element, the plane defined by the path of movement of the cutting edge of the tool lying adjacent the axis of the element, and means for rotating the tool and element about the respective axes thereof in such timed relation as to cause said tool to move into successive operative engagement with a plurality of teeth disposed at points spaced by more than one tooth about the periphery of said element on each rotation of the tool.

14. In a machine for pointing tooth ends of internally toothed elements, the combination with means supporting a toothed element to be pointed for rotation on the axis thereof, of a cutting tool, means supporting said tool for rotation about an axis transverse to the axis of said element, said tool axis being fixed with respect to the element being pointed, during the pointing operation, and being disposed in a plane generally perpendicular to the axis of said element, the plane defined by the path of movement of the cutting edge of the tool lying adjacent the axis of the element, and means for rotating the tool and element about the respective axes thereof in such timed relation as to cause said tool to move into simultaneous cutting engagement with the end edges of adjacent teeth on the element and thereafter into simultaneous engagement with the end edges of adjacent teeth peripherally spaced from said first named adjacent teeth during each rotation of the tool.

15. In a machine for pointing tooth ends of internally toothed elements, the combination with means supporting a toothed element to be pointed for rotation on the axis thereof, of a cutting tool, means supporting said tool for rotation about an axis transverse to the axis of said element, said tool axis being fixed with respect to the element being pointed, during the pointing operation, and being disposed in a plane generally perpendicular to the axis of said element, the plane defined by the path of movement of the cutting edge of the tool lying adjacent the axis of the element, and means for rotating the tool and element about the respective axes thereof in such timed relation as to cause said tool to move into successive operative engagement with a plurality of generally oppositely disposed teeth on each rotation of the tool and into operative engagement with different teeth during each successive complete rotational movement of the tool.

JOHN M. CHRISTMAN.